(12) United States Patent
Inagaki et al.

(10) Patent No.: US 9,216,765 B2
(45) Date of Patent: Dec. 22, 2015

(54) PARKING ASSIST APPARATUS, PARKING ASSIST METHOD AND PROGRAM THEREOF

(71) Applicant: AISIN SEIKI KABUSHIKI KAISHA, Kariya-shi, Aichi-ken (JP)

(72) Inventors: Hiroki Inagaki, Okazaki (JP); Masanori Torii, Kariya (JP); Yasumasa Yamamoto, Chita-gun (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 36 days.

(21) Appl. No.: 14/193,244

(22) Filed: Feb. 28, 2014

(65) Prior Publication Data

US 2014/0244070 A1 Aug. 28, 2014

(30) Foreign Application Priority Data

Feb. 28, 2013 (JP) ................................. 2013-039894

(51) Int. Cl.
*B60W 30/06* (2006.01)
*B62D 15/02* (2006.01)

(52) U.S. Cl.
CPC .................................. *B62D 15/0285* (2013.01)

(58) Field of Classification Search
None
See application file for complete search history.

(56) References Cited

U.S. PATENT DOCUMENTS

| 7,053,794 B2* | 5/2006 | Tanaka | B60Q 9/004 340/436 |
| 7,643,935 B2* | 1/2010 | Sakakibara | B62D 15/0275 340/932.2 |
| 2005/0055139 A1* | 3/2005 | Tanaka | B62D 15/0285 701/1 |
| 2010/0049402 A1* | 2/2010 | Tanaka | B60R 1/00 701/41 |
| 2010/0079307 A1* | 4/2010 | Tanaka | B62D 15/028 340/932.2 |

FOREIGN PATENT DOCUMENTS

JP 2005-067566 A 3/2005

* cited by examiner

*Primary Examiner* — John R Olszewski
*Assistant Examiner* — Jess Whittington
(74) *Attorney, Agent, or Firm* — Sughrue Mion, PLLC

(57) ABSTRACT

A parking assist apparatus includes a detection portion detecting a parking target position from a captured image captured by an imager or from distance information measured by a distance measuring portion, a setting portion setting the detected parking target position as a target of the parking assist, a moving amount calculation portion calculating a moving amount of the vehicle, the moving amount being calculated before the parking target position is set as the target of the parking assist, a correction portion correcting the parking target position on the basis of the calculated moving amount, and a display portion displaying a surrounding image which represents an external environment around the vehicle and a parking region image which indicates the parking-possible region at the parking target position corrected by the correction portion in a manner that the surrounding image and the parking region image are superimposed on each other.

14 Claims, 9 Drawing Sheets

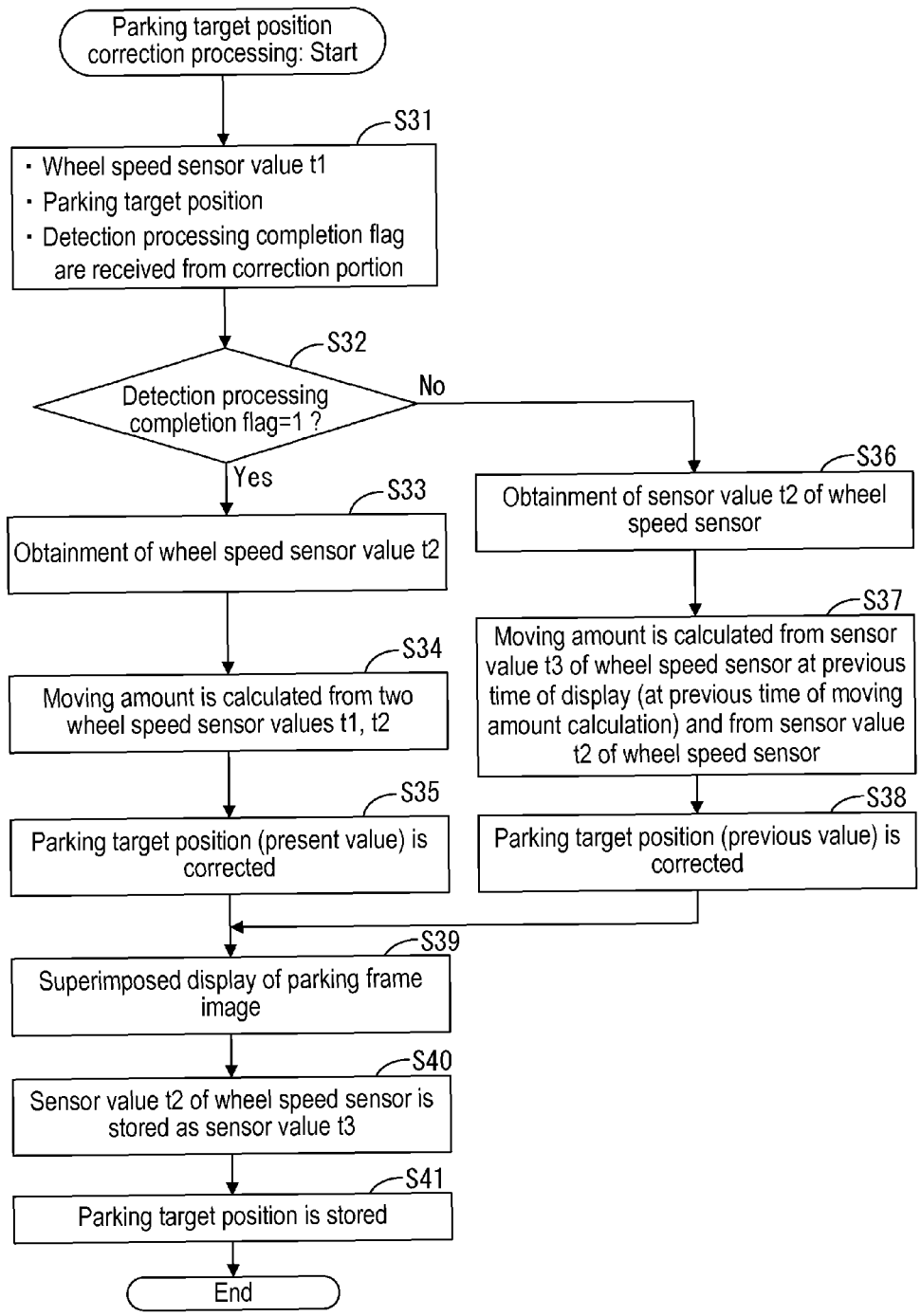

F I G. 10 A
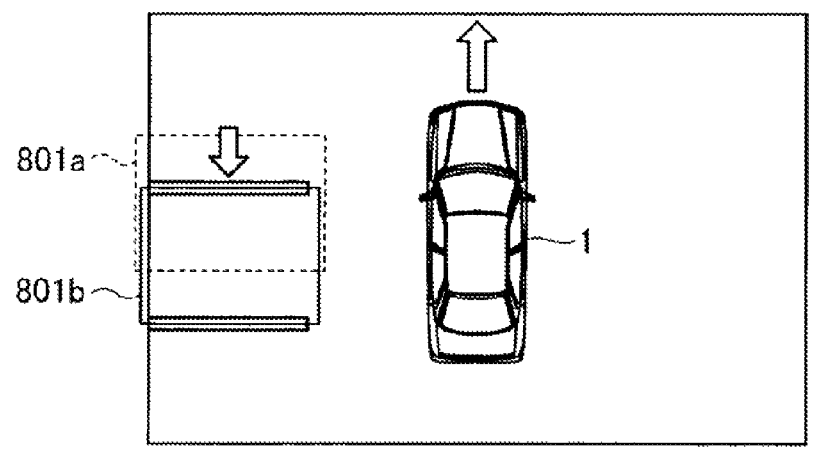
F I G. 10 B
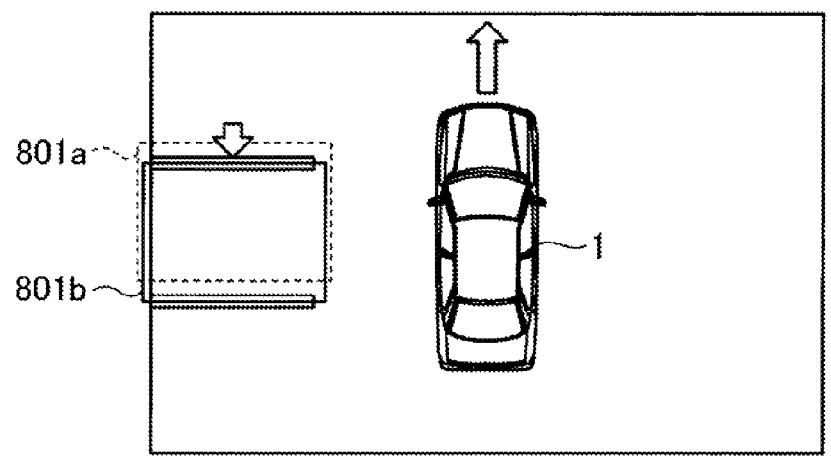

PARKING ASSIST APPARATUS, PARKING ASSIST METHOD AND PROGRAM THEREOF

CROSS REFERENCE TO RELATED APPLICATIONS

This application is based on and claims priority under 35 U.S.C. §119 to Japanese Patent Application 2013-039894, filed on Feb. 28, 2013, the entire content of which is incorporated herein by reference.

TECHNICAL FIELD

This disclosure generally relates to a parking assist apparatus, a parking assist method and a program thereof.

BACKGROUND DISCUSSION

Conventionally, a known parking assist system displays, on a display device, an image representing an external environment around a vehicle. A parking target position that corresponds to a target position where the vehicle is to be parked is superimposed on the image representing the external environment around the vehicle. According to technology employed in the known parking assist system (for example, JP2005-67566A which will be hereinafter referred to as Patent reference 1), in a case where movement, for example, a backward movement, of the vehicle is detected after the parking target position is set, a moving amount of the vehicle is calculated, and the parking target position is corrected in accordance with the calculated moving amount and then a corrected set target parking position is displayed on the display device.

However, according to the technology of the known parking assist system of Patent reference 1, the moving amount of the vehicle is calculated and the parking target position is corrected only after the parking target position is set. Accordingly, in a case where, for example, a parking-possible region is periodically detected as the parking target position and the detected parking target position is displayed on the display device sequentially before the parking target position is set by the parking assist system and/or a driver, due to a delay in a processing of displaying the parking target position, the displayed parking target position differs from an actual parking target position because the vehicle has moved during a period of time from the detection of the parking-possible region to the display of the parking target position. Thus, a difference or mismatch between the displayed parking target position and the actual parking target position occurs.

A need thus exists for a parking assist apparatus, a parking assist method and a computer readable medium including a program thereof, which is not susceptible to the drawback mentioned above.

SUMMARY

According to an aspect of this disclosure, a parking assist apparatus includes a detection portion for detecting a parking target position indicating a position of a parking-possible region for a vehicle to be parked from a captured image captured by an imager which is configured to be provided at the vehicle and sequentially captures an image of the parking-possible region or from distance information measured by a distance measuring portion which is configured to be provided at the vehicle and sequentially measures a distance from the vehicle, a setting portion for setting the detected parking target position as a target of the parking assist, a moving amount calculation portion for calculating a moving amount of the vehicle from a time point when the captured image is captured or from a time point when the distance information is measured to a present time point, the moving amount being calculated before the parking target position is set as the target of the parking assist, a correction portion for correcting the parking target position on the basis of the calculated moving amount, and a display portion for displaying a surrounding image which represents an external environment around the vehicle and a parking region image which indicates the parking-possible region at the parking target position corrected by the correction portion in a manner that the surrounding image and the parking region image are superimposed on each other.

According to another aspect of this disclosure, a parking assist apparatus includes a detection portion for detecting a parking target position indicating a position of a parking-possible region for a vehicle to be parked from a captured image captured by an imager which is configured to be provided at the vehicle and sequentially captures an image of the parking-possible region or from distance information measured by a distance measuring portion which is configured to be provided at the vehicle and sequentially measures a distance from the vehicle, a setting portion for setting the detected parking target position as a target of the parking assist, a moving amount calculation portion for calculating a moving amount of the vehicle before the parking target position is set as the target of the parking assist, the moving amount calculation portion calculating the moving amount from a time point when a parking region image which is obtained by the detection of a previous parking target position is displayed to a time point when a present parking region image is displayed, after the previous parking target position is detected before the present parking target position is detected, the time point when the present parking region image is displayed corresponding to a present time point, a correction portion for correcting the parking target position on the basis of the calculated moving amount, and a display portion for displaying a surrounding image which represents an external environment around the vehicle and the parking region image which indicates the parking-possible region at the parking target position corrected by the correction portion in a manner that the surrounding image and the parking region image are superimposed on each other.

According to another aspect of this disclosure, a parking assist method includes steps of detecting a parking target position indicating a position of a parking-possible region for a vehicle to be parked from a captured image captured by an imager which is configured to be provided at the vehicle and sequentially captures an image of the parking-possible region or from distance information measured by a distance measuring portion which is configured to be provided at the vehicle and sequentially measures a distance from the vehicle, setting the detected parking target position as a target of the parking assist, calculating a moving amount of the vehicle from a time point when the captured image is captured or from a time point when the distance information is measured to a present time point, the moving amount being calculated before the parking target position is set as the target of the parking assist, correcting the parking target position on the basis of the calculated moving amount, and displaying a surrounding image which represents an external environment around the vehicle and a parking region image which indicates the parking-possible region at the parking target position corrected at the step of correcting the parking target position, in a manner that the surrounding image and the parking region image are superimposed on each other.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a flowchart illustrating a procedure of a parking target position correction processing according to the embodiment;

FIG. 10A is a first view for explaining the correction processing of the parking target position in a case where the detection processing of the parking target position is not completed, according to the embodiment; and FIG. 10B is a second view for explaining the correction processing of the parking target position in a case where the detection processing of the parking target position is not completed, according to the embodiment.

DETAILED DESCRIPTION OF THE EXEMPLARY EMBODIMENTS

An exemplary embodiment disclosed here will be described hereunder, where a vehicle 1 includes a parking assist apparatus, a parking assist method and a computer readable medium including a program according to this embodiment. In this embodiment, the vehicle 1 may correspond to, for example, an automobile whose drive source is an internal combustion engine, an automobile whose drive source is an electric motor (such as an electric vehicle or a fuel cell powered vehicle) or an automobile whose drive source is both the internal combustion engine and the electric motor (that is, a hybrid vehicle). In addition, the vehicle 1 may have a speed change apparatus, that is, a transmission, which can be a variety of kinds. The vehicle 1 may also have various apparatuses (for example, systems, parts and components) that actuate the internal combustion engine and/or the electric motor. In addition, the type, number, layout and the like of an apparatus related to driving the vehicle 1 may be set in various ways.

Figure 1:
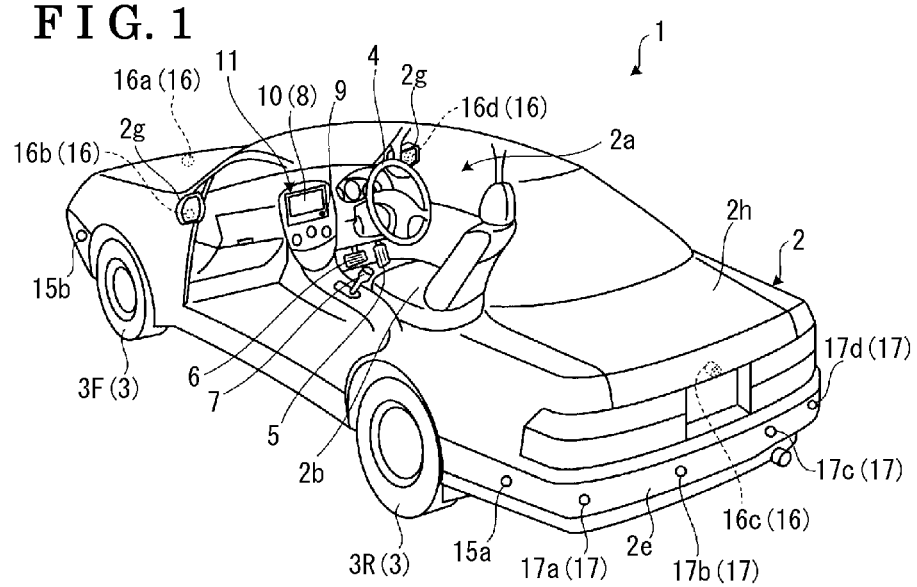
FIG. 1 is a perspective view illustrating part of a vehicle cabin of a vehicle according to an embodiment disclosed herein.

As illustrated in FIG. 1, the vehicle 1 includes a vehicle body 2 with a vehicle cabin 2a that holds an occupant, such as a driver. For example, a steering portion 4, an acceleration operation portion 5, a brake operation portion 6, a shift operation portion 7 are provided inside the vehicle cabin 2a so as to face a seat 2b of the driver. In this exemplary embodiment, the steering portion 4 corresponds to a steering wheel arranged to protrude from a dashboard (an instrument panel) of the vehicle 1, the acceleration operation portion 5 corresponds to an accelerator pedal positioned at or in a vicinity of a driver's foot, the brake operation portion 6 corresponds to a brake pedal positioned at or in a vicinity of the driver's foot, and the shift operation portion 7 corresponds to a shift lever arranged to protrude from a center console. However, the steering portion 4, the acceleration operation portion 5, the brake operation portion 6, the shift operation portion 7 are not limited thereto.

In addition, a display device 8 (a display output portion) and an audio output device 9 (an audio output portion) are provided in the vehicle cabin 2a. The display device 8 corresponds to, for example, a liquid crystal display (LCD) or an organic electroluminescent display (OELD). The audio output device 9 corresponds to, for example, a speaker. In addition, in this exemplary embodiment, the display device 8 is covered with an operation input portion 10 (for example, a touch panel) which is transparent. The occupant and the like may visually recognize a projected image (an image) displayed on a display screen of the display device 8 via the operation input portion 10. In addition, the occupant and the like may perform operation input (instruction input) by operating, that is, for example, by touching, pressing and/or moving the operation input portion 10 with his/her finger or the like, at a position which corresponds to the projected image (the image) displayed on the display screen of the display device 8. In addition, in this exemplary embodiment, a monitor device 11, which is positioned at a central portion of the dash board in a vehicle width direction (a left/right direction), includes the display device 8, the audio output device 9, the operation input portion 10 and the like. The monitor device 11 may include an operation input portion corresponding to, for example, a switch, a dial, a joystick or a push button. In addition, another audio output device (not shown) may be provided in the vehicle cabin 2a at a position that is other than the monitor device 11. Audio including, for example, sound or voice, may be outputted from the audio output device 9 of the monitor device 11 and from the other audio output device. The monitor device 11 of this exemplary embodiment also serves as a navigation system and/or an audio system. However, the monitor device for the parking assist apparatus may be provided separately from the navigation system and/or the audio system.

Figure 2:
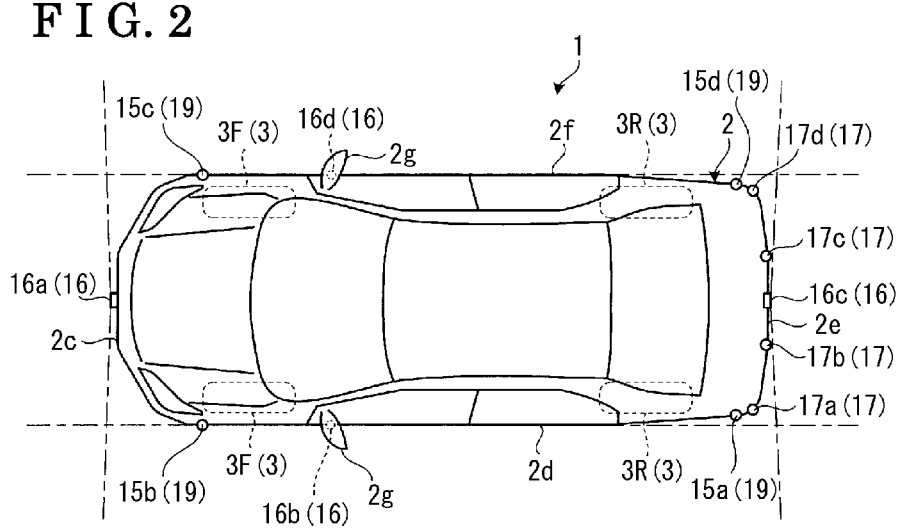
FIG. 2 is a plan view (bird's-eye view) illustrating an example of the vehicle according to the embodiment.
Figure 3:
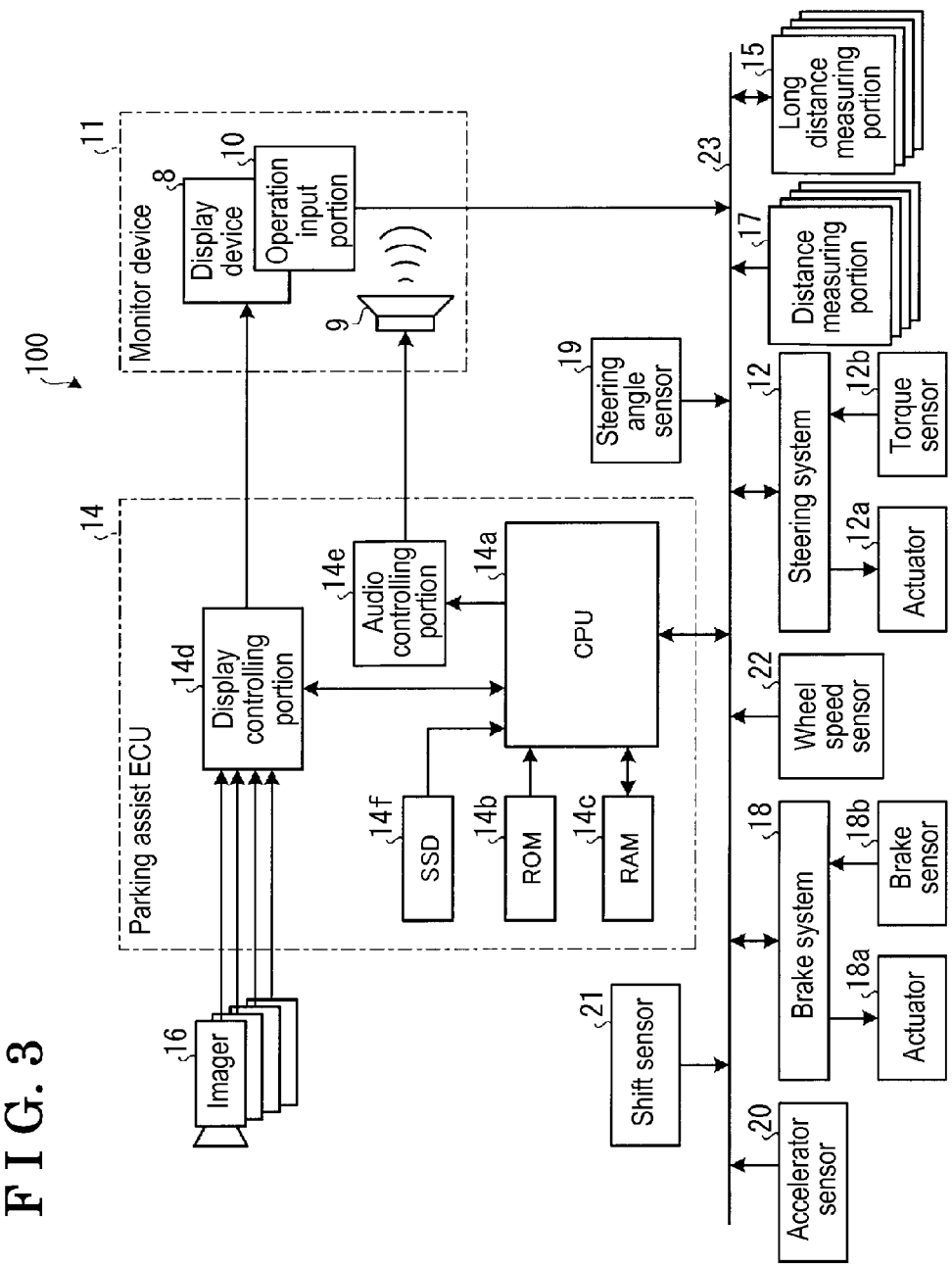
FIG. 3 is a block diagram illustrating a configuration of a parking assist system of the vehicle according to the embodiment.

As illustrated in FIGS. 1 and 2, in this exemplary embodiment, the vehicle 1 corresponds to a four-wheel vehicle (a four-wheel automobile), and includes two front wheels 3F provided at a left side and a right side, respectively, and two rear wheels 3R provided at the left side and the right side, respectively. Further, in this embodiment, each of the four wheels 3 is configured to be steered, that is, each of the four wheels 3 is steerable. Specifically, as illustrated in FIG. 3, the vehicle 1 includes a steering system 12 which steers the wheels 3. The steering system 12 is electrically controlled by, for example, a parking assist ECU 14 (electronic control unit), and operates an actuator 12a. The steering system 12 corresponds to, for example, an electric power steering system or a steer by wire (SBW) system. The steering system 12 applies torque (assist torque) to the steering portion 4 by means of the actuator 12a to supplement a steering force, and steers (automatic steering) the wheels 3. The actuator 12a may steer one wheel 3 or may steer plural wheels 3.

In addition, in this exemplary embodiment, as illustrated in FIG. 2, the vehicle 1 (the vehicle body 2) includes plural (for example, four in this embodiment) imagers 16 (imagers 16a, 16b, 16c and 16d). Each of the imagers 16, that is, the image capturing portion, is a digital camera having therein an imaging element or an image pick-up device, including, for example, a charge coupled device (CCD) and/or CMOS image sensor (CIS). The imager 16 may output image data (moving image data, frame data) at a predetermined frame rate. Each of the imagers 16 includes a wide-angle lens and can image an area (an angle of visibility) which ranges from 140 degrees to 190 degrees in a horizontal direction. In addition, an optical axis of the imager 16 is set in a downward direction (obliquely downwardly). Accordingly, the imager 16 sequentially, that is, periodically, captures an image of an external environment around the vehicle body 2, which includes a road surface on which the vehicle 1 may move and/or a parking-possible region for the vehicle 1 to be parked, and sends or transmits the captured image as data of the captured image.

In this exemplary embodiment, the imager 16a is arranged at an end portion 2c (the end portion when viewed in a plan view) at a front side (a forward side in a vehicle front/rear direction) of the vehicle body 2, and is provided at, for example, a front bumper. The imager 16b is arranged at an end portion 2d at a left side (the left side in the vehicle width direction) of the vehicle body 2, and is provided at a door mirror 2g (a protruding portion) at the left side. The imager 16c is arranged at an end portion 2e at a rear side (a rearward side in the vehicle front/rear direction) of the vehicle body 2, and is provided at a wall portion below a door 2h of a rear trunk. The imager 16d is arranged at an end portion 2f at a right side (the right side in the vehicle width direction) of the vehicle body 2, and is provided at a door mirror 2g (a protruding portion) at the right side. The parking assist ECU 14 executes a calculation processing and/or an image processing on the basis of the image data obtained at the plural imagers 16, and may produce or generate an image including a wider angle of visibility and/or a virtual bird's-eye image, that is, an overhead view (a planar image) in which the vehicle 1 (the vehicle body 2) is seen from above.

In addition, from the image obtained at the imagers 16, the parking assist ECU 14 distinguishes, for example, a parking space line which is drawn on the road surface around the vehicle 1 and detects (extracts) a parking space which is indicated by, for example, the parking space lines.

In addition, in this exemplary embodiment, as illustrated in FIGS. 1 and 2, the vehicle 1 (the vehicle body 2) is provided with plural distance measuring portions 17 (17a, 17b, 17c, 17d) and plural long distance measuring portions 15 (15a, 15b, 15c, 15d) at, for example, eight measuring portions in total. The distance measuring portion 17 and the long distance measuring portion 15 correspond to, for example, sonar (a sonar sensor, that is, an ultrasonic wave detector) that emits ultrasonic sound waves and then captures the reflected waves. The distance measuring portions 17 and the long distance measuring portions 15 serve as the distance measuring portion of this disclosure. The parking assist ECU 14 may determine presence or absence of an object (an obstacle) which is positioned rearward relative to the vehicle 1 (the vehicle body 2) and may measure a distance according to the detection results of the distance measuring portions 17. Further, the parking assist ECU 14 may determine presence or absence of an object (an obstacle) which is positioned in a direction of each lateral surface of the vehicle 1 (the vehicle body 2) and may measure a distance according to the detection results of the long distance measuring portions 15. That is, the distance measuring portions 17 and the long distance measuring portions 15 are example of a detection portion that detects, from the vehicle 1, an object which exists in the external environment.

As illustrated in FIG. 3, in this exemplary embodiment, in addition to the parking assist ECU 14, the monitor device 11, the steering system 12, the distance measuring portions 17 and the like, a parking assist system 100 includes, for example, a brake system 18, a steering angle sensor 19 (an angle sensor), an accelerator sensor 20, a shift sensor 21 and a wheel speed sensor 22 electrically connected to one another via an in-vehicle network 23 (for example via an electric communication line). The in-vehicle network 23 is configured, for example, as a controller area network (CAN). The parking assist ECU 14 may control the steering system 12, the brake system 18 and the like by transmitting a control signal via the in-vehicle network 23. In addition, via the in-vehicle network 23, the parking assist ECU 14 may receive detection results of a torque sensor 12b, a brake sensor 18b, the steering angle sensor 19 (for the front wheels 3F), the long distance measuring portions 15, the distance measuring portions 17, the accelerator sensor 20, the shift sensor 21, the wheel speed sensor 22 and the like, respectively. In addition, via the in-vehicle network 23, the parking assist ECU 14 may receive an instruction signal (a control signal, an operation signal, an input signal, data) of, for example, the operation input portion 10.

As also illustrated in FIG. 3, the parking assist ECU 14 includes, for example, CPU 14a (central processing unit), ROM 14b (read only memory), RAM 14c (random access memory), a display controlling portion 14d, an audio controlling portion 14e, and SSD 14f (solid state drive, flash memory). For example, the CPU 14a may execute an image processing related to the image which is displayed at the display device 8, and various calculation processing including, for example, the calculation of a moving path of the vehicle 1 and determination of a presence or an absence of interference between the vehicle 1 and an object. The CPU 14a may read a program stored (installed) in a nonvolatile memory device such as, for example, the ROM 14b, and may execute the calculation processing in accordance with the program. The RAM 14c temporarily stores the data which are used in the calculation executed at the CPU 14a. The display controlling portion 14d mainly executes, for example, image processing (for example, image synthesis or image compositing) of the image data obtained at the imagers 16 to provide the image data that are displayed at the display device 8. The audio controlling portion 14e mainly executes processing of the audio data outputted at the audio output device 9. The SSD 14f is a rewritable nonvolatile storage portion, and thus stores the data even in a case where a power supply of the parking assist ECU 14 is switched off. The CPU 14a, the ROM 14b, the RAM 14c and the like may be integrated in the same package. In addition, the parking assist ECU 14 may include a configuration where another logic operation processor, logic circuit or the like, including, for example, a digital signal processor (DSP), is used instead of the CPU 14a. In addition, the parking assist ECU 14 may be provided with a hard disk drive (HDD) instead of the SSD 14*f*. The SSD 14*f* and/or the HDD may be provided separately from the parking assist ECU 14.

The brake system 18 corresponds to, for example, an anti-lock brake system (ABS) which restricts the brake from being locked, a skidding prevention device (ESC: electronic stability control) which restricts the vehicle 1 from skidding when being in a cornering condition, an electric brake system which enhances a brake force (which executes brake assist) and brake by wire (BBW). The brake system 18 applies a braking effort to the wheel 3 (the vehicle 1) via an actuator 18*a*.

The steering angle sensor 19 corresponds to a sensor which detects an amount of steering (a rotation angle) of the steering portion 4 (in this exemplary embodiment, a steering wheel), and includes a Hall element, for example. The parking assist ECU 14 obtains, from the steering angle sensor 19, the amount of the steering operation performed at the steering portion 4 by the driver and the amount of the steering operation of each of the wheels 3 which is conducted during automatic-driving, and executes each control. The torque sensor 12*b* detects torque that the driver applies to the steering portion 4.

The wheel speed sensor 22 corresponds to a sensor which detects an amount of rotations of the wheel 3 and/or the number of rotations of the wheel 3 per unit time. The wheel speed sensor 22 detects the number of wheel speed pulses, which indicates the number of rotations. The wheel speed sensor 22 outputs the detected number of wheel speed pulses, as a sensor value. The wheel speed sensor 22 includes a Hall element, for example.

The parking assist ECU 14 calculates, for example, a moving amount of the vehicle 1 on the basis of a sensor value obtained from the wheel speed sensor 22, and executes each of the parking controls. The wheel speed sensor 22 may be provided as a part of the brake system 18. That is, the brake system 18 may detect a sign, indication or the like of the locking of the brake, idle rotation of the wheel 3 and skidding on the basis of, for example, a rotational difference between the wheel 3 at the left side and the wheel 3 at the right side, and may execute each of the braking controls. In a case where the wheel speed sensor 22 is provided as part of the brake system 18, the parking assist ECU 14 obtains the data via the brake system 18. The brake sensor 18*b* corresponds to a sensor which detects an operation amount of a brake pedal, and the parking assist ECU 14 obtains this data via the brake system 18. For example, in a case where the brake operation portion 6 is operated during the automatic steering, the parking assist ECU 14 determines that the vehicle 1 is in situations that are unsuitable for the automatic steering, and may interrupt or stop the automatic steering.

The shift sensor 21 may correspond to a sensor (a switch) which detects a position of a movable part (for example, a lever, an arm, a button) of the shift operation portion 7, and may include for example, a displacement sensor. For example, the parking assist ECU 14 may start an assist control in a case where the movable part is set at reverse, and the parking assist ECU 14 may end the assist control in a case where the movable part is shifted from reverse to forward.

The configuration, arrangements, electrical connection manner, etc. of each of the sensors and/or actuators of the exemplary embodiment described above are examples only, and may be changed or modified in various ways.

Figure 4:
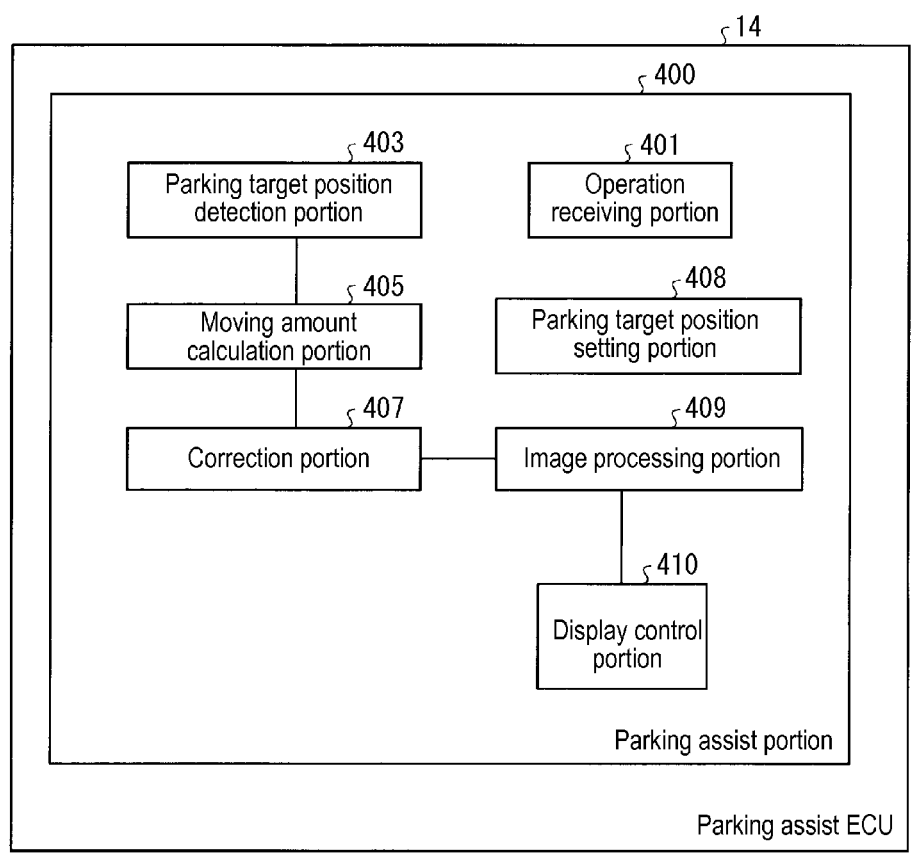
FIG. 4 is a block diagram illustrating a configuration of a parking assist apparatus according to the embodiment.

Next, a configuration of a parking assist portion 400, which is implemented in the parking assist ECU 14, will be described. As illustrated in FIG. 4, the parking assist portion 400 includes an operation receiving portion 401, a parking target position detection portion 403 (i.e., the detection portion), a moving amount calculation portion 405, a correction portion 407, a parking target position setting portion 408 (i.e., a setting portion), an image processing portion 409 (i.e., a display portion) and a display control portion 410 (i.e., the display portion).

Each of configurations in the parking assist portion 400 illustrated in FIG. 4 is implemented by the execution of a parking assist program stored in the ROM 14*b*, by the CPU 14*a* configured as the parking assist ECU 14 illustrated in FIG. 3. That is, by executing the parking assist program stored in the ROM 14*b*, the parking assist portion 400 implements the operation receiving portion 401, the parking target position detection portion 403, the moving amount calculation portion 405, the correction portion 407, the parking target position setting portion 408, the image processing portion 409 and the display control portion 410. Each of these portions may be configured to be implemented by hardware.

In a case where the vehicle 1 is moved to be parked, the parking assist portion 400 detects a position of a parking-possible region as a parking target position. The parking assist portion 400 displays parking frame image data, which indicates the parking-possible region in a manner that the parking frame image data is superimposed or overlapped on bird's-eye image data which represents or shows the environment around the vehicle 1 (the superimposed display). At this time, the parking assist portion 400 of this embodiment calculates a moving amount of the vehicle 1 from a time point when the captured image is captured by the imager 16 to detect the parking target position to a time point when the parking frame image data is displayed, from the sensor value of the wheel speed sensor 22. The parking assist portion 400 corrects the parking target position on the basis of the moving amount, and then displays the parking frame image data in a manner that the parking frame image data is superimposed or overlapped on the corrected parking target position on the bird's-eye image data.

The operation receiving portion 401 receives the instruction signals (the control signals) of, for example, the operation input portion 10. From the instruction signals, the operation receiving portion 401 may receive the operation by the driver.

The parking target position detection portion 403 sequentially detects the parking target position, which indicates a position coordinate of the parking-possible region where the vehicle can be parked, at regular intervals. In this exemplary embodiment, specifically, the parking target position detection portion 403 performs an edge extraction on the captured image data outputted by the imagers 16 when the vehicle 1 is moving backward, when the vehicle 1 is moving forward, and at a time when the vehicle 1 is stopped. By performing the edge extraction, the parking target position detection portion 403 detects parking space lines, that is, for example, a pair of white lines provided on a running surface on which the vehicle 1 is running or travelling. Thus, the parking target position detection portion 403 detects the parking target position in a manner that a region surrounded or enclosed by the pair of parking space lines is considered as the parking-possible region. The method of calculating the parking target position is not limited thereto.

From among the parking target positions sequentially detected by the parking target position detection portion 403, the parking target position setting portion 408 sets the parking target position which will be a final parking target (i.e., a target of the parking assist). For example, the parking target position setting portion 408 may receive a specification or designation of a parking frame image specified by the driver from among the parking frame images which are sequentially displayed at the target position on the bird's-eye image on the display device 8. The parking target position setting portion 408 may set a position of the driver specified parking frame image as the final parking target position. Alternatively, for example, in a case where it is detected from the steering angle sensor 19 that the driver has started a parking operation toward a position indicated by the parking frame image, the parking target position setting portion 408 may set the position of the parking frame image as the final parking target position. However, the method of setting the parking target position is not limited thereto.

Before a stage where the parking target position is set by the parking target position setting portion 408 (that is, at a stage where the parking-possible regions are sequentially detected by the parking target position detection portion 403), the moving amount calculation portion 405 calculates the moving amount of the vehicle 1 according to the sensor value (a pulse value) outputted from the wheel speed sensor 22. The moving amount refers to the amount of movement of the vehicle 1 from the time point when the captured image is captured by the imager 16 (that is, before the detection processing of the parking target position by the parking target position detection portion 403 is started), to a present time point. Here, the time point when the captured image is captured includes time points before and after the image capturing. In addition, the present time point is equivalent to the time point when the parking frame image at the parking target position is displayed on the display device 8.

The correction portion 407 corrects the parking target position detected at the parking target position detection portion 403, on the basis of the moving amount of the vehicle 1 which is calculated by the moving amount calculation portion 405, that is, the moving amount from a time point when the captured image is captured to the time point when the parking frame image is displayed.

The calculation of the moving amount of the vehicle 1 which is calculated by the moving amount calculation portion 405 and a correction processing of the parking target position which is executed by the correction portion 407 will be described below in detail.

At regular intervals, the image processing portion 409 generates the bird's-eye image data as a surrounding image which is the view of the external environment around the vehicle 1 seen from above. The image processing portion 409 sequentially generates the bird's-eye image data on the basis of the image data representing the external environment of the vehicle 1 which is captured by the imagers 16 and on the basis of conversion information or transformation information recorded in a mapping table. An image of the moving vehicle 1 is included in the display of the bird's-eye image data. Thus, the movement or displacement of the vehicle 1 is also reflected in the sequentially generated bird's-eye image data.

In addition, the image processing portion 409 generates the parking frame image data as a parking region image. The parking frame image data indicates the parking-possible region and includes a frame-like shape. Then, the image processing portion 409 draws or images the parking frame image data so that the parking frame image data is superimposed on the parking target position of the bird's-eye image data, that is, on the position coordinate of the corrected parking target position which is corrected by the correction portion 407.

The display control portion 410 executes control that causes the bird's-eye image data, on which the parking frame image data is superimposed, to be displayed on the display device 8. In addition thereto, the display control portion 410 executes control that causes various images and menus to be displayed on the display device 8.

Next, a parking assist processing performed by the parking assist portion 400 of this embodiment, which includes the above-described configuration, will be described. The parking assist processing of this embodiment includes a parking target position detection processing and a parking target position correction processing. First, the parking target position detection processing will be described with reference to FIGS. 5 and 6.

Figure 6:
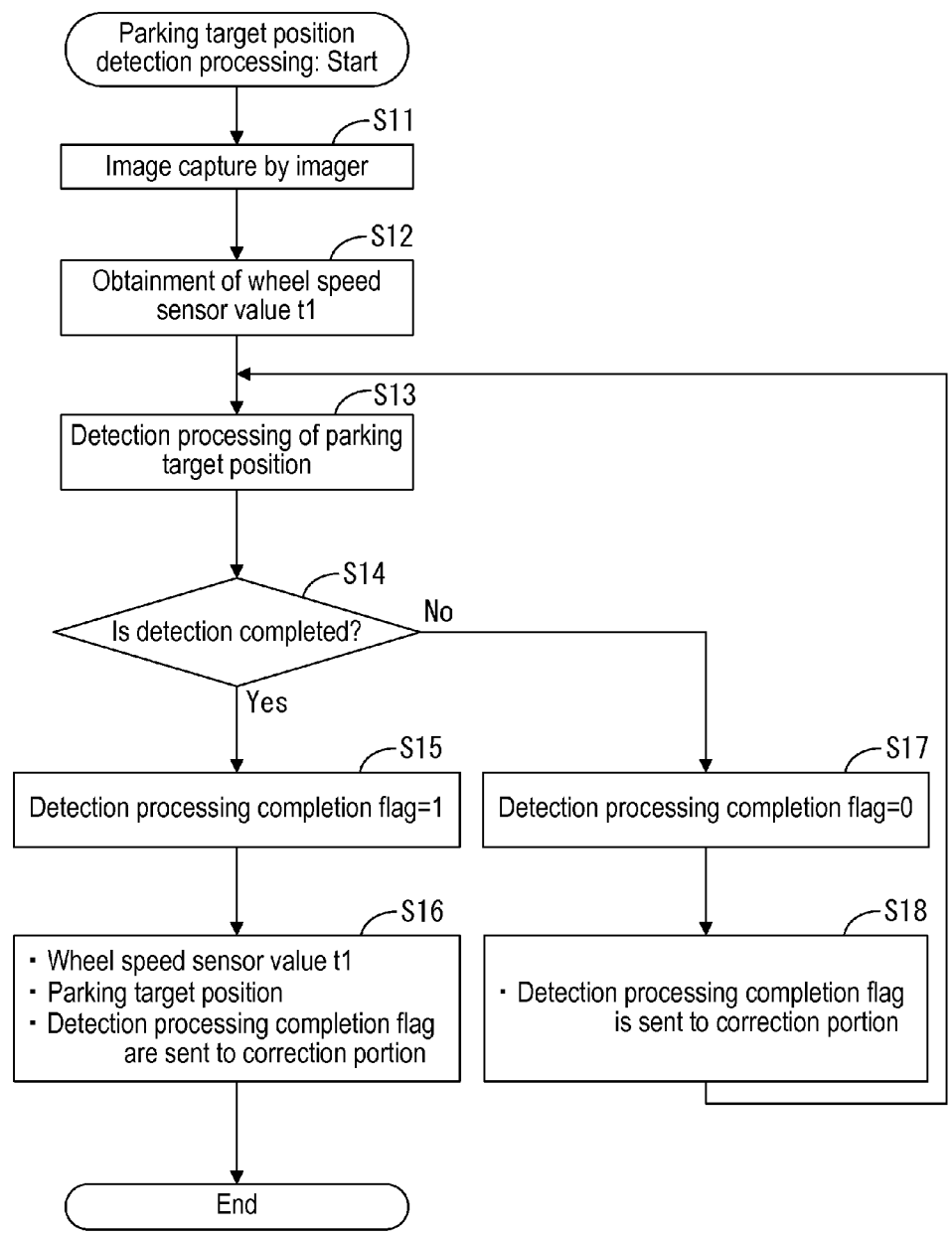
FIG. 6 is a flowchart illustrating a procedure of a parking target position detection processing according to the embodiment.

Here, the processing illustrated in FIG. 6 is executed at regular intervals. Hereinafter, each of the parking target position detection processing and the parking target position correction processing, which is currently being executed, will be referred to as a present processing. Each of the parking target position detection processing and the parking target position correction processing, which is executed immediately before the present processing, that is, the time before the present processing, will be referred to as a previous processing. Accordingly, hereinafter, the parking target position which is detected and corrected at the present processing will be referred to as a present parking target position, and the parking target position which is detected and corrected at the previous processing will be referred to as a previous parking target position.

First, the imager 16 captures or takes the image of the surrounding region including the parking-possible region where the vehicle 1 may be parked (Step S11). Then, the parking target position detection portion 403 obtains the data of the captured image from the imager 16, and further, the parking target position detection portion 403 obtains a sensor value t1 from the wheel speed sensor 22 at a time of starting this detection processing of the parking target position (Step S12). That is, this sensor value corresponds to the sensor value at the time point when the captured image data is captured by the imager 16. Then, the parking target position detection portion 403 executes the parking target position detection processing from the obtained data of the captured image (Step S1, Step S13).

Then, in a case where the parking target position detection processing is completed (Step S14: Yes), the parking target position detection portion 403 sets a detection processing completion flag at 1 (Step S15), and sends the sensor value t1 of the wheel speed sensor 22 at the time point when the image data is captured, the parking target position, and the detection processing completion flag to the correction portion 407 (Step S16), and ends the parking target position detection processing.

Here, the detection processing completion flag is a flag that indicates whether or not the detection processing of the parking target position is completed, and is set by the parking target position detection portion 403. In a case where the detection processing completion flag is 1, it is indicated that the detection processing of the parking target position is completed. In a case where the detection processing completion flag is 0, it is indicated that the detection processing of the parking target position is not completed.

At Step S14, in a case where the parking target position detection processing is not completed yet (Step S14: No), the parking target position detection portion 403 sets the detection processing completion flag at 0 (Step S17), and sends the detection processing completion flag to the correction portion 407 (Step S18). Then, the processing returns to Step S13 and the detection processing of the parking target position is continued.

Next, the correction processing of the parking target position will be described with reference to FIGS. 5 and 7. The correction portion 407 receives the sensor value t1 of the wheel speed sensor 22 at the time point when the image data is captured by the imager 16, the parking target position, and the detection processing completion flag from the parking target position detection portion 403 (Step S31). Then, the correction portion 407 determines the detection processing completion flag and performs a switch determination with regard to the correction processing (Step S2, Step S32), that is, the correction portion 407 determines whether the correction processing of Step S35 is to be executed or the correction processing of Step S38 is to be executed.

In a case where the detection processing completion flag is 1 and therefore the detection processing of the parking target position is completed (Step S32: Yes), a moving amount calculation processing of Step S3 (Step S33, Step S34) and the correction processing of Step S4 (Step S35) are executed.

On the other hand, in a case where the detection processing completion flag is 0 and therefore the detection processing of the parking target position is not completed (Step S32: No), the moving amount calculation processing of Step S6 (Step S36, Step S37) and the correction processing of Step S7 (Step S38) are executed.

That is, in a case where the detection processing of the parking target position is completed (Step S32; Yes), the moving amount calculation portion 405 obtains a sensor value t2 from the wheel speed sensor 22 at the present time point (that is, the time point when the parking frame image data is displayed) (Step S33), and calculates the moving amount (i.e., a first moving amount) of the vehicle 1 according to the sensor value t1 of the time point when the image data is captured and the obtained sensor value t2 (Step S3, Step S34). Then, the correction portion 407 corrects the parking target position detected at Step S1 (the parking target position of a present value) based on the moving amount of the vehicle 1 which is calculated by the moving amount calculation portion 405 (Step S4, Step S35). Here, the correction portion 407 may correct the parking target position in three axes, that is, a lateral direction of the vehicle 1, a lengthwise direction (that is, a longitudinal direction of the vehicle 1) and an angle of the vehicle 1.

Then, the image processing portion 409 generates the display image which is drawn by superimposing the parking frame image on the corrected parking target position on the bird's-eye image data, and the display control portion 410 displays the display image on the display device 8 (Step S5, Step S39).

Figure 8A:
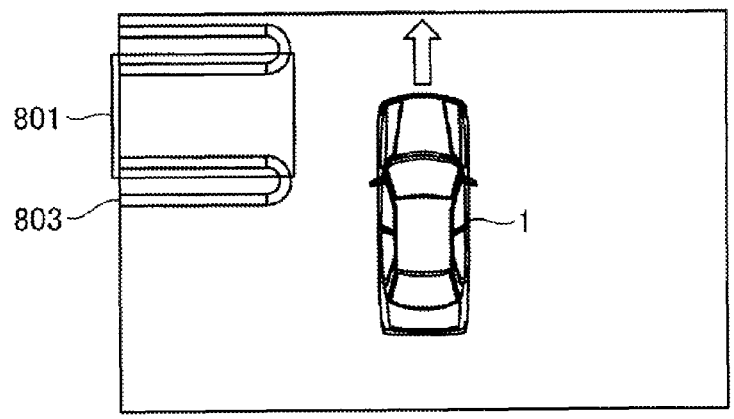
FIG. 8A is a first view illustrating an example where a parking frame image is superimposed on a bird's-eye image according to the embodiment.
Figure 8B:
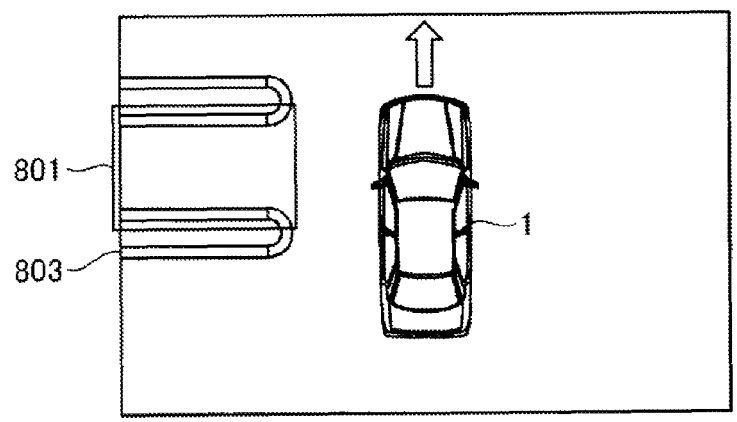
FIG. 8B is a second view illustrating an example where the parking frame image is superimposed on the bird's-eye image according to the embodiment.
Figure 8C:
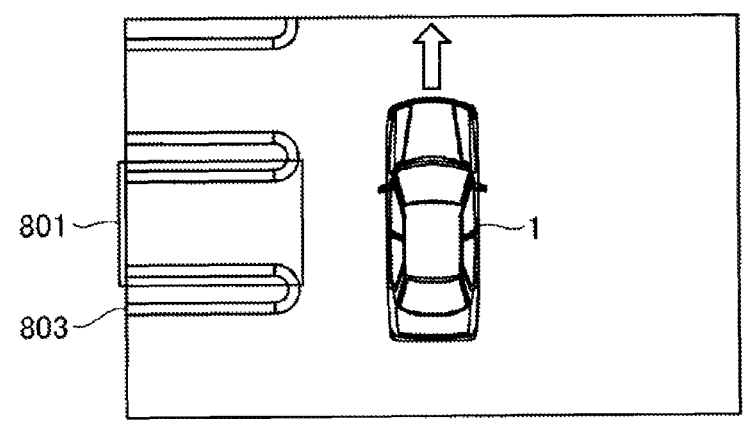
FIG. 8C is a third view illustrating an example where the parking frame image is superimposed on the bird's-eye image according to the embodiment.

As illustrated in FIGS. 8A to 8C, the parking target position detection portion 403 detects a white line 803 as the parking target position. By the image processing portion 409 and the display control portion 410, a parking frame image 801 (i.e., the parking region image) is displayed at the detected parking target position so as to be superimposed on the bird's-eye image. Here, the vehicle 1 moves or travels forward in an order of FIG. 8A, FIG. 8B and FIG. 8C.

Figure 9A:
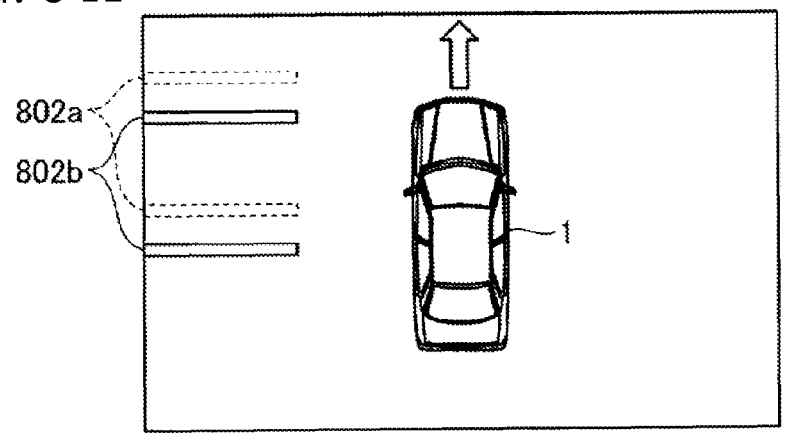
FIG. 9A is a first view for explaining the correction processing of the parking target position according to the embodiment.
Figure 9B:
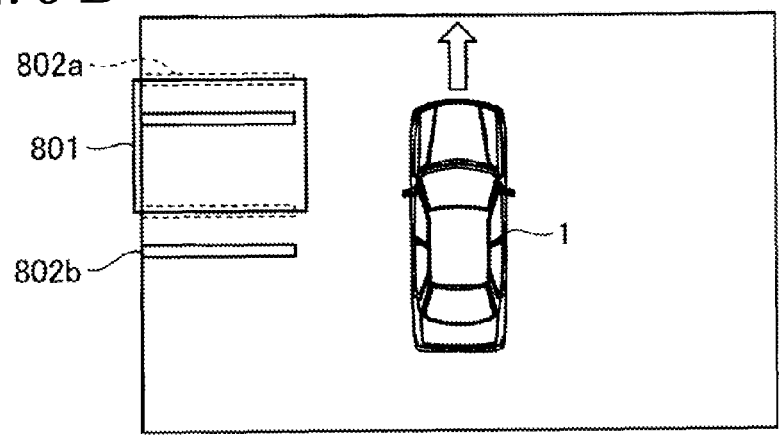
FIG. 9B is a second view for explaining the correction processing of the parking target position according to the embodiment.

In a case where the vehicle is moving as illustrated in FIGS. 8A to 8C, there arises a time lag between the time point when the image data is captured by the imager 16 and the time point when the parking frame image is displayed, as illustrated in FIG. 9A. Here, a parking target position 802a at the image data captured-time point corresponds to the parking target position 802a at the time point when the captured image data is captured, and a parking target position 802b at the parking frame image-displayed time point corresponds to the parking target position 802b at the time point when the parking frame image is displayed. Thus, if the parking frame image 801 is displayed as is at the parking target position 802a at the image data captured-time point, a difference occurs relative to the parking target position 802b which is a correct position, that is, an actual target position at the time point when the parking frame image 801 is displayed, as illustrated in FIG. 9B.

Figure 9C:
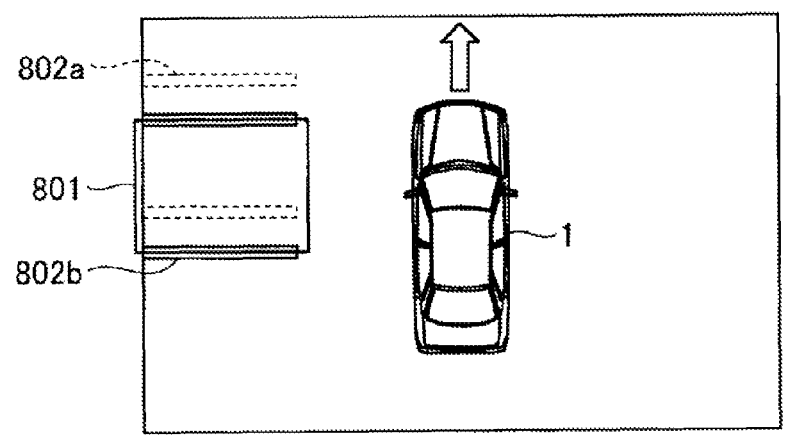
FIG. 9C is a third view for explaining the correction processing of the parking target position according to the embodiment.

Therefore, in this embodiment, as illustrated in FIG. 9C, the moving amount of the vehicle 1 from the time point, when the image data is captured by the imager 16, to the time point, when the parking frame image is displayed, is calculated and derived as described above. Then, by the moving amount of the vehicle 1, the parking target position 802a at the image data captured-time point is shifted in a direction opposite to the traveling direction of the vehicle 1. The shifted (that is, corrected) position of the parking target position 802a corresponds to the parking target position 802b at the parking frame image-displayed time point. Then, the parking frame image 801 is displayed at the parking target position 802b after the correction. Thus, the parking frame image 801 comes to be displayed without the difference relative to the actual parking target position 802b at the time point when the parking frame image is displayed.

Here, the detection processing of the parking target position is conducted at regular intervals, however, in a case where the interval is long, that is, a cycle of the detection processing of the parking target position is long, the parking frame image may not be displayed smoothly. Because a time interval of the detection of the parking target position is long in a case where the cycle of the detection processing of the parking target position is long, a big difference exists between a display position of a parking frame image 801a which is displayed at the previous detection processing of the parking target position and a display position of a parking frame image 801b which is displayed at the present detection processing of the parking target position as illustrated in FIG. 10A. Accordingly, it is difficult to realize a smooth display of the parking frame image.

Thus, in this embodiment, as illustrated in FIG. 10B, in a case where the detection processing of the parking target position is being executed and is not completed yet, the previously detected parking target position is corrected by using the moving amount of the vehicle 1 so that the difference between the display position of the parking frame image 801a and the display position of the parking frame image 801b becomes small, and accordingly the smooth image is displayed. Specifically, the below-mentioned processing is executed.

Figure 5:
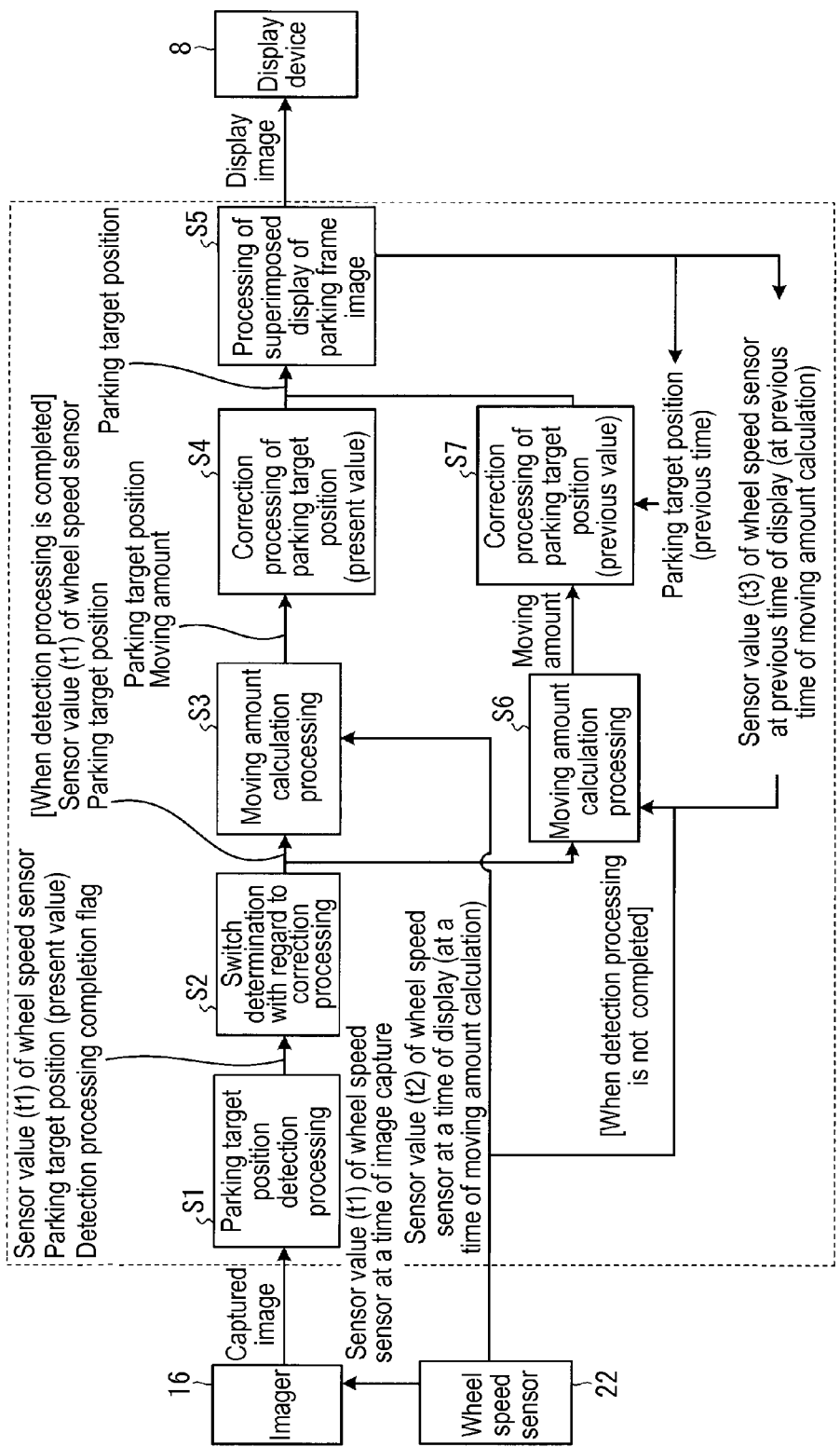
FIG. 5 is a diagram illustrating a flow of a parking assist processing according to the embodiment.

In FIGS. 5 and 7, in a case where the detection of the parking target position is not completed at Step S32 (Step S32: No), the moving amount calculation portion 405 obtains the sensor value t2 from the wheel speed sensor 22 at the present time point (that is, the time point when the parking frame image is displayed) (Step S36). Then, the moving amount calculation portion 405 calculates the moving amount (i.e. a second moving amount) of the vehicle 1 from the obtained sensor value t2, and a sensor value t3 which is obtained from the wheel speed sensor 22 at the time of display of the parking frame image at the correction processing of the parking target position at the time of execution of the previous detection processing (at the previous time of display, that is, at the previous time of the moving amount calculation) (Step S6, Step S37). Then, the correction portion 407 corrects the parking target position, which is corrected at the previous correction processing (the previous parking target position), by the moving amount of the vehicle 1 which is calculated by the moving amount calculation portion 405 at Step S6 (Step S7, Step S38).

Here, the sensor value t3 of the wheel speed sensor 22 at the time when the previous moving amount was calculated previously (at the time when the previous parking frame image was displayed) and the previous parking target position are stored in the RAM 14c at the previous correction processing of the parking target position (Step S40, Step S41 at the previous correction processing of the parking target position, each of which will be described later).

Then, the image processing portion 409 generates the display image which is drawn by superimposing the parking frame image on the corrected parking target position on the bird's-eye image data, and the display control portion 410 displays the display image on the display device 8 (Step S5, Step S39).

Next, the moving amount calculation portion 405 stores the sensor value t2 (the sensor value at the time point of the display) obtained from the wheel speed sensor 22 at Step S3, Step S33, Step S6, Step S36, as the sensor value t3 in the RAM 14c. The sensor value t3 corresponds to the sensor value at the previous time of the image display (at the previous time of the moving amount calculation) which is used at Step S6, Step S37 of the processing that is executed in a case where the parking target position is not detected the next time (Step S40).

Next, the correction portion 407 stores the present parking target position in the RAM 14c as the parking target position corrected in the previous correction processing (the previous parking target position) which is used at Step S7, Step S38 of the processing that is executed in a case where the parking target position is not detected the next time (Step S41), and ends the processing.

As described above, in this embodiment, the parking target position 802a at the image data captured-time point is shifted in the direction opposite to the traveling direction by the moving amount of the vehicle 1 from the time point when the image data is captured by the imager 16 to the time point when the parking frame image is displayed. The shifted (that is, corrected) position of the parking target position 802a corresponds to the parking target position 802b at the parking frame image-displayed time point. Then, the parking frame image is displayed at the parking target position 802b after the correction. Thus, before the parking target position is set, the parking frame image is displayed in a state where the difference relative to the actual parking target position is eliminated. Accordingly, the parking assist for the user may be provided more effectively.

In addition, in this embodiment, in a case where the detection processing of the parking target position is being executed and is not completed yet, the correction of the parking target position is performed relative to the previously detected parking target position, by using the moving amount of the vehicle 1. Thus, even in a case where the execution cycle of the detection processing of the parking target position is long, the difference between the display positions of the parking frame image is reduced, and thus the smooth image display is performed.

This disclosure is not limited to the aforementioned exemplary embodiment. The embodiment is presented as an example and is not provided to intend to limit the scope of the disclosure. This embodiment may be implemented in various manners other than the presented example, and various omissions, substitution and changes may be provided without departing from the scope of the disclosure. This embodiment and variations thereof are included in the scope and subject matter of the disclosure, and are included in the disclosure described in the scope of claims and a range of equivalents thereof.

For example, in this exemplary embodiment, the parking target position detection portion 403 detects the parking target position from the data of the captured image which is outputted from the imager 16. The moving amount calculation portion 405 calculates the moving amount of the vehicle 1 from the time when the image data is captured by the imager 16 to the time when the parking frame image is displayed (the present time point). However, the embodiment is not limited thereto. For example, the parking target position detection portion 403 may be configured so that the ultrasonic waves are emitted in the lateral direction and/or in the rearward direction of the vehicle 1 by sonar of the distance measuring portion 17 and the long distance measuring portion 15, and the reflected waves of the ultrasonic waves from the object (the obstacle) are detected, and thereby a distance from the vehicle 1 to the object is measured. Thus, the parking target position of the vehicle 1 is detected by using the measured distance.

In this case, the moving amount calculation portion 405 may be configured so that the moving amount of the vehicle 1 from the time when the distance (i.e., distance information) is measured by the sonar of the distance measuring portion 17 and/or the long distance measuring portion 15 to the time when the parking frame image is displayed (the present time point) is calculated. The correction portion 407 may be configured to execute the correction of the parking target position from the moving amount that is calculated as described above. Thus, the similar effects to those of the aforementioned embodiment may be obtained. In this case, the processing executed in Step S11 of FIG. 6 corresponds to a measurement processing of the distance from the vehicle 1 to the object, which is performed by the sonar of the distance measuring portion 17 and/or the long distance measuring portion 15, instead of the image capturing performed by the imager 16.

In addition, in this embodiment, the parking frame image is displayed so as to be superimposed on the bird's-eye image. However, the image processing portion 409 and/or the display control portion 410 may be configured so that the parking frame image is displayed to be superimposed on an image representing the external environment around the vehicle 1, other than the bird's-eye image.

In addition, in this embodiment, the parking frame image including the frame-like shape is displayed at the parking target position, however, the image is not limited to the frame-like shape as long as the image indicates or shows the position of the parking-possible region.

In addition, in this embodiment, the moving amount of the vehicle 1 is calculated from the sensor value of the wheel speed sensor 22, however, the calculation of the moving amount of the vehicle 1 is not limited thereto. For example, the moving amount calculation portion 405 may be configured so that a position of the vehicle 1 at the time point when the image data is captured and a position of the vehicle 1 at the time point at which the image is displayed are detected by, for example, a global positioning system (GPS), and the moving amount of the vehicle 1 is calculated from the detected positions.

In addition, in this embodiment, the parking target position is corrected in three axes, that is, the lateral direction of the vehicle 1, the lengthwise direction of the vehicle 1 and the angle of the vehicle 1, however, the correction is not limited thereto. For example, the correction portion 407 may be configured so that the correction is conducted in only one of the aforementioned three axes.

The parking assist program which is implemented at the parking assist portion 400 of this embodiment may be configured to be provided in a state where the parking assist program is recorded or stored, in a file which is installable form or executable form, in a computer-readable storage medium, including, for example, CD-ROM, a flexible disk (FD), CD-R or a Digital Versatile Disk (DVD).

In addition, the parking assist program which is implemented at the parking assist portion 400 of this embodiment may be configured to be provided in a manner that the parking assist program is stored in a computer connected to a network, including, for example, to Internet, and is downloaded via the network. In addition, the parking assist program which is implemented at the parking assist portion 400 of this embodiment may be configured to be provided or distributed via a network, including, for example, Internet.

According to the aforementioned embodiment, the parking assist apparatus includes the parking target position detection portion 403 for detecting the parking target position indicating the position of the parking-possible region for the vehicle 1 to be parked from the captured image captured by the imagers 16 which are configured to be provided at the vehicle 1 and sequentially capture the image of the parking-possible region or from the distance measured by the distance measuring portions 17 and the long distance measuring portions 15 which are configured to be provided at the vehicle 1 and sequentially measure the distance from the vehicle 1, the parking target position setting portion 408 for setting the detected parking target position as the target of the parking assist, the moving amount calculation portion 405 for calculating the moving amount of the vehicle 1 from the time point when the captured image is captured or from the time point when the distance is measured to the present time point, the moving amount being calculated before the parking target position is set as the target of the parking assist, the correction portion 407 for correcting the parking target position on the basis of the calculated moving amount, and the image processing portion and the display control portion 410 for displaying the surrounding image which represents the external environment around the vehicle 1 and the parking frame image which indicates the parking-possible region at the parking target position corrected by the correction portion 407 in a manner that the surrounding image and the parking frame image are superimposed on each other.

According to the above-described configuration, for example, before the parking target position is set, the difference between the displayed parking target position and the actual parking target position is eliminated. Accordingly, parking assistance for the user may be provided more effectively.

According to the aforementioned embodiment, after the previous parking target position is detected, in a case where the present parking target position which differs from the previous parking target position is detected, the moving amount calculation portion 405 calculates the first moving amount of the vehicle 1 from the time point when the captured image for the detection of the present parking target position is captured or from the time point when the distance for the detection of the present parking target position is measured to the time point when the parking frame image is displayed, the time point when the parking frame image is displayed corresponding to the present time point, and the correction portion 407 corrects, on the basis of the calculated first moving amount, the parking target position which is detected presently.

According to the above-described configuration, for example, before the parking target position is set, the difference between the displayed parking target position and the actual parking target position is eliminated. Accordingly, parking assistance for the user may be provided more effectively.

According to the aforementioned embodiment, after the previous parking target position is detected before the present parking target position is detected, the moving amount calculation portion 405 calculates the second moving amount of the vehicle 1 from the time point when the parking frame image which is obtained by the detection of the previous parking target position is displayed to the time point when the present parking frame image is displayed, the time point when the present parking frame image is displayed corresponding to the present time point, and the correction portion 407 corrects, on the basis of the calculated second moving amount, the parking target position which is corrected on the basis of the detection of the previous parking target position.

According to the above-described configuration, for example, even in a case where the execution cycle of the parking target position detection processing is long, the difference between the display positions of the parking frame image is reduced, and thus the smooth image display is performed.

According to the aforementioned embodiment, the parking assist apparatus includes the wheel speed sensor 22 for detecting the wheel speed pulse of the vehicle 1 and outputting the sensor value, wherein the moving amount calculation portion 405 calculates the moving amount from the sensor value t1 at the time point when the captured image is captured or the time point when the distance is measured, and the sensor value t2 at the time point when the parking frame image is displayed.

According to the aforementioned embodiment, the parking assist apparatus includes the parking target position detection portion 403 for detecting the parking target position indicating the position of the parking-possible region for the vehicle 1 to be parked from the captured image captured by the imagers 16 which are configured to be provided at the vehicle 1 and sequentially capture the image of the parking-possible region or from the distance measured by the distance measuring portions 17 and the long distance measuring portions 15 which are configured to be provided at the vehicle 1 and sequentially measure the distance from the vehicle 1, the parking target position setting portion 408 for setting the detected parking target position as the target of the parking assist, the moving amount calculation portion 405 for calculating the moving amount of the vehicle 1 before the parking target position is set as the target of the parking assist, the moving amount calculation portion 405 calculating the moving amount from the time point when the parking frame image which is obtained by the detection of the previous parking target position is displayed to the time point when the present parking frame image is displayed, after the previous parking target position is detected before the present parking target position is detected, the time point when the present parking frame image is displayed corresponding to the present time point, the correction portion 407 for correcting the parking target position on the basis of the calculated moving amount, and the image processing portion 409 and the display control portion 410 for displaying the surrounding image which represents the external environment around the vehicle 1 and the parking frame image which indicates the parking-possible region at the parking target position corrected by the correction portion 407 in a manner that the surrounding image and the parking frame image are superimposed on each other.

According to the above-described configuration, for example, even in a case where the execution cycle of the parking target position detection processing is long, the difference between the display positions of the parking frame images is reduced, and thus the smooth image display is performed.

According to the aforementioned embodiment, the parking assist method includes steps of detecting the parking target position indicating the position of the parking-possible region for the vehicle 1 to be parked from the captured image captured by the imagers 16 which are configured to be provided at the vehicle 1 and sequentially capture the image of the parking-possible region or from the distance measured by the distance measuring portions 17 and the long distance measuring portions 15 which are configured to be provided at the vehicle 1 and sequentially measure the distance from the vehicle 1, setting the detected parking target position as the target of the parking assist, calculating the moving amount of the vehicle 1 from the time point when the captured image is captured or from the time point when the distance information is measured to the present time point, the moving amount being calculated before the parking target position is set as the target of the parking assist, correcting the parking target position on the basis of the calculated moving amount, and displaying the surrounding image which represents the external environment around the vehicle 1 and the parking frame image which indicates the parking-possible region at the parking target position corrected at the step of correcting the parking target position, in a manner that the surrounding image and the parking frame image are superimposed on each other.

According to the above-described configuration, for example, before the parking target position is set, the difference between the displayed parking target position and the actual parking target position is eliminated. Accordingly, the parking assist for the user may be provided more effectively.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assist apparatus comprising:
an imager provided at a vehicle that sequentially captures images;
a monitor device; and
a control unit including
a detection portion configured to detect a parking target position indicating a position of a parking-possible region for a vehicle from a captured image captured by the imager or from distance information measured by a distance measuring portion which is provided at the vehicle and which sequentially measures a distance from the vehicle to an object;
a moving amount calculation portion configured to calculate a moving amount of the vehicle from a time point when the captured image is captured or from a time point when the distance information is measured to a present time point;
a correction portion configured to calculate a corrected parking target position, the corrected parking target position correcting the detected parking target position based on the calculated moving amount;
a setting portion configured to set the corrected parking target position as a parking assist target; and
a display portion configured to display a surrounding image which represents an external environment around the vehicle from the images captured by the imager and a parking region image which indicates the parking-possible region at the corrected parking target position on the monitor device at the present time point in a manner that the surrounding image and the parking region image are superimposed on each other.

2. The parking assist apparatus according to claim 1, wherein
after the detection portion detects a previous parking target position and later detects a present parking target position which differs from the previous parking target position,
the moving amount calculation portion calculates a first moving amount of the vehicle from the time point when the captured image for the detection of the present parking target position is captured or from the time point when the distance information for the detection of the present parking target position is measured to a time point when the parking region image is displayed, the time point when the parking region image is displayed corresponding to the present time point, and
the correction portion calculates, based on the calculated first moving amount, the corrected parking target position.

3. The parking assist apparatus according to claim 2, wherein
after the detection portion detects the previous parking target position and before the detection portion detects the present parking target position, the moving amount calculation portion calculates a second moving amount of the vehicle from the time point when the parking region image which is obtained by the detection of the previous parking target position is displayed to the time point when the present parking region image is displayed, the time point when the present parking region image is displayed corresponding to the present time point, and
the correction portion calculates the corrected parking target position based on the calculated second moving amount, and the detection of the previous parking target position.

4. The parking assist apparatus according to claim 1, further comprising:
a wheel speed sensor configured to detect wheel speed pulse of the vehicle and to output a sensor value, wherein
the moving amount calculation portion calculates the moving amount from the sensor value at the time point when the captured image is captured or the time point when the distance information is measured, and the sensor value at the time point when the parking region image is displayed.

5. The parking assistance apparatus according to claim 1, wherein the surrounding image is a bird's eye image including the images captured by the imager and an image of the vehicle.

6. A parking assist apparatus comprising:
an imager provided at a vehicle that sequentially captures images;
a monitor device; and
a control unit including
a detection portion configured to detect a parking target position indicating a position of a parking-possible region for a vehicle from a captured image captured by the imager or from distance information measured by a distance measuring portion which is provided at the vehicle and sequentially measures a distance from the vehicle to an object;

a moving amount calculation portion configured to calculate a moving amount of the vehicle before the parking target position is set as the parking assist target, the moving amount calculation portion calculating the moving amount from a time point when a parking region image which is obtained by the detection of a previous parking target position is displayed to a time point when a present parking region image is displayed, after the previous parking target position is detected and before a present parking target position is detected, the time point when the present parking region image is displayed corresponding to a present time point;

a correction portion configured to calculate a corrected parking target position, the corrected parking target position correcting the detected parking target position based on the calculated moving amount;

a setting portion configured to set the corrected parking target position as a parking assist target; and a display portion configured to display a surrounding image which represents an external environment around the vehicle from the images captured by the imager and the parking region image which indicates the parking-possible region at the corrected parking target position on the monitor at the present time point in a manner that the surrounding image and the parking region image are superimposed on each other.

7. The parking assistance apparatus according to claim 6, wherein the surrounding image is a bird's eye image including the images captured by the imager and an image of the vehicle.

8. A parking assist method, comprising:

detecting a parking target position indicating a position of a parking-possible region for a vehicle from a captured image or from distance information, the captured image being captured by an imager which is provided at the vehicle and which sequentially captures images, the distance information being measured by a distance measuring portion which is provided at the vehicle and which sequentially measures a distance from the vehicle to an object;

calculating a moving amount of the vehicle from a time point when the captured image is captured or from a time point when the distance information is measured to a present time point calculating a corrected parking target position, the corrected parking target position correcting the detected parking target position on based on the calculated moving amount;

setting the corrected parking target position as a parking assist target; and displaying a surrounding image which represents an external environment around the vehicle from the images captured by the imager and a parking region image which indicates the parking-possible region at the corrected parking target position on a monitor device at the present time point in a manner that the surrounding image and the parking region image are superimposed on each other.

9. The parking assist method according to claim 8, wherein a previous parking target position is detected and later a present parking target position which differs from the previous parking target position is detected, a first moving amount of the vehicle is calculated from the time point when the captured image for the detection of the present parking target position is captured or from the time point when the distance information for the detection of the present parking target position is measured to a time point when the parking region image is displayed, the time point when the parking region image is displayed corresponding to the present time point, and the corrected parking target position is calculated based on the calculated first moving amount.

10. The parking assist method according to claim 9, wherein after the previous parking target position and before the present parking target position is detected, a second moving amount of the vehicle is calculated from the time point when the parking region image which is obtained by the detection of the previous parking target position is displayed to the time point when the present parking region image is displayed, the time point when the present parking region image is displayed corresponding to the present time point, and the corrected parking target position is calculated based on the calculated second moving amount and the detection of the previous parking target position.

11. The parking assist method according to claim 8, further comprising:

detecting a wheel speed pulse of the vehicle and outputting a sensor value, wherein the moving amount is calculated from the sensor value at the time point when the captured image is captured or the time point when the distance information is measured, and the sensor value at the time point when the parking region image is displayed.

12. The parking assistance method according to claim 8, wherein the surrounding image is a bird's eye image including the images captured by the imager and an image of the vehicle.

13. A non-transitory computer readable medium storing a program that provides a parking assist method, comprising:

detecting a parking target position indicating a position of a parking-possible region for a vehicle from a captured image or from distance information, the captured image being captured by an imager which is provided at the vehicle and which sequentially captures images, the distance information being measured by a distance measuring portion which is provided at the vehicle and which sequentially measures a distance from the vehicle to an object;

calculating a moving amount of the vehicle from a time point when the captured image is captured or from a time point when the distance information is measured to a present time point;

calculating a corrected parking target position, the corrected parking target position correcting the detected parking target position on based on the calculated moving amount;

setting the corrected parking target position as a parking assist target; and displaying a surrounding image which represents an external environment around the vehicle from the images captured by the imager and a parking region image which indicates the parking-possible region at the corrected parking target position on a monitor device at the present time point in a manner that the surrounding image and the parking region image are superimposed on each other.

14. The non-transitory computer readable medium according to claim 13, wherein the surrounding image is a bird's eye image including the images captured by the imager and an image of the vehicle.

\* \* \* \* \*